United States Patent [19]
Shoda

[11] Patent Number: 5,691,585
[45] Date of Patent: Nov. 25, 1997

[54] TERMINAL CONNECTION FOR AN ELECTRIC MOTOR WITH A SPEED REDUCER

[75] Inventor: Hirokazu Shoda, Gunma-ken, Japan

[73] Assignee: Mitsuba Electric Manufacturing Co., Ltd., Gunma-ken, Japan

[21] Appl. No.: 620,031

[22] Filed: Mar. 21, 1996

[30] Foreign Application Priority Data

Mar. 28, 1995 [JP] Japan ................................. 7-094429

[51] Int. Cl.$^6$ ...................................................... H02K 5/00
[52] U.S. Cl. ........................... 310/71; 310/239; 310/241; 310/249; 310/248
[58] Field of Search ...................... 310/71, 239, 241, 310/249, 248, 83

[56] References Cited

U.S. PATENT DOCUMENTS

| | | | |
|---|---|---|---|
| 3,745,393 | 7/1973 | Spors | 310/239 |
| 4,614,886 | 9/1986 | Schneider et al. | 310/83 |
| 5,194,769 | 3/1993 | Ade et al. | 310/51 |
| 5,218,255 | 6/1993 | Horiguchi | 310/71 |
| 5,309,053 | 5/1994 | Ade et al. | 310/71 |

FOREIGN PATENT DOCUMENTS

| | | |
|---|---|---|
| 0 603 083 A1 | 6/1994 | European Pat. Off. . |
| 4-128069 | 11/1992 | Japan . |
| 6-21360 | 3/1994 | Japan . |
| 6-29014 | 4/1994 | Japan . |

Primary Examiner—Clayton E. LaBalle
Assistant Examiner—Timothy A. Williams
Attorney, Agent, or Firm—Oliff & Berridge

[57] ABSTRACT

A terminal connector in an electric motor permits easy and smooth connection between a brush terminal and a power terminal by installing a case cover to a case frame. A support plate fixed to the case cover is divided into a terminal portion provided with a power terminal and an output shaft portion disposed on the output shaft side. The terminal portion is supported so that it is movable with respect to the output shaft portion. During assembly the terminal portion is movable to assure connection between the brush terminal and the power terminal.

19 Claims, 9 Drawing Sheets

TERMINAL CONNECTION FOR AN ELECTRIC MOTOR WITH A SPEED REDUCER

BACKGROUND OF THE INVENTION

1. Field of the Invention

The present invention relates to the structure of terminal connection in an electric motor with a speed reducer that is used for an automotive electric device such as a wiper motor.

2. Description of the Related Art

A motor with a speed reducer includes a brush holder fixed to a case frame that supports a worm reducer for reducing the output of the electric motor and an output shaft. A brush terminal is electrically connected to the brush that slides and contacts a commutator provided on the brush holder. A support plate, provided with a power terminal electrically connected to a power supply lead wire, is fixed to a case cover. The case cover is installed from the axial direction of the output shaft with respect to the case frame.

When the case cover is mounted on the case frame, the power terminal and the brush terminal must be inserted to make an electrical connection. However, these terminals are conventionally fixed to the brush holder and the case cover. Therefore, the terminals must be accurately positioned when installing the case cover to the case frame. This leads to poor work efficiency and an accumulated dimensional tolerance from the case cover, the frame, the brush holder, etc., which prevents smooth connection of the terminals in a predetermined position. As a result, the terminals may deform, or a stable supply of electric current may not be secured.

SUMMARY OF THE INVENTION

Accordingly, an object of the present invention is to provide a terminal connection in an electric motor with a speed reducer that is capable of solving the problems stated above. According to the present invention, an electric motor with a speed reducer comprises a brush holder fixed to a case frame supporting a worm reducer for reducing the output of the electric motor and an output shaft. The brush holder is provided with a brush terminal to be electrically connected to a brush that slides and contacts a commutator. A support plate is provided with a power terminal electrically connected to a power supply lead wire, and is fixed to a case cover. The case cover is installed from the axial direction of the output shaft with respect to the case frame, thereby electrically connecting the power terminal and the brush terminal. The support plate is divided into a terminal portion provided with the power terminal and an output shaft portion to be disposed on the output shaft side. The terminal portion is supported so that it moves with respect to the output shaft portion.

The structure according to the present invention described above permits easy and smooth connection of the brush terminal and the power terminal.

DETAILED DESCRIPTION OF A PREFERRED EMBODIMENT

An embodiment of the present invention will be described in conjunction with the accompanying drawings. In the drawings, an electric motor 1 comprises a wiper motor. The electric motor 1 is constructed primarily by a motor shaft 3 rotatably journaled by a bottom cylindrical yoke 2, an armature core 4 attached to motor shaft 3, a coil 5 wound around armature core 4, a permanent magnet 6 attached to the inner circumferential surface of yoke 2, a commutator 7 attached to motor shaft 3, and a brush 8 that slides and contacts commutator 7. The embodiment basically has a similar construction as a conventional electric motor.

A case frame 9 is integrally assembled to the edge on the opening side of yoke 2. The distal end of motor shaft 3 projects out of yoke 2 into case frame 9. The distal end of motor shaft 3 includes a pair of worms 3a, 3b having thread grooves that are oriented oppositely from each other. Worms 3a, 3b have a pair of worm gears 10, 10 that are rotatably supported on the bottom surface of case frame 9 and which mesh with each other. Worm gears 10, 10 are provided integrally with first gears 11, 11 with a small diameter on the same axis as worm gears 10, 10. First gears 11, 11 mesh with a second gear 12 that has a large diameter. An output shaft 13, that is rotatably journaled on the bottom surface of case frame 9 via bearing 9a, is attached to second gear 12 so that it rotates together with second gear 12 as one piece. The driving force of electric motor 3 is reduced via worms 3a, 3b, worm gears 10, 10, first gears 11, 11, and second gear 12 before it is supplied to output shaft 13 so as to activate a wiper actuator (not shown) that is interlocked and linked with output shaft 13.

A brush holder 14 is fixed to the yoke-side edge of case frame 9. Brush 8 is supported by brush holder 14 so that it may be urged toward commutator 7 and it may be free to move in the inside and outside diameter directions. The part of brush holder 14 that juts out toward case frame 9 includes three brush terminal pieces 15a, 15b, 15c that are electrically connected via pig tails 8a to three brushes 8 for low speed, high speed, and grounding, respectively.

A case cover 16 is fixed with screw 17 to case frame 9 to cover the top opening of case frame 9. A support plate 18, made of an insulating material, which will be discussed later, is attached to the inner surface of case cover 16.

Support plate 18 includes a terminal side portion 19 and a output shaft side portion 20. The two halves 19 and 20 are respectively provided with laps 19a and 20a that overlap when terminal side portion 19 is positioned on the inner surface of case cover 16. A retaining hook 19b, which projects from lap 19a of terminal side portion 19, is loosely inserted in an engaging hole 20b formed in lap 20a of output shaft side portion 20. Retaining hook 19b supports terminal side portion 19 so that it freely slides in direction A in FIG. 3 with respect to output shaft side portion 20.

Laps 19a and 20a of the two halves 19 and 20 further include through holes 19c and 20c into which two fixing projections 16a, which jut out from the inner surface of case cover 16 toward case frame 9, are inserted. Through hole 19c in terminal side portion 19 has a large-diameter slot in the vertical direction, i.e. direction A, in FIG. 3, whereas through hole 20c in output shaft side portion 20 has a small diameter. Thus, output shaft side portion 20 can be fixed to case cover 16 while allowing terminal side portion 19 to move, by loosely inserting fixing projection 16a on case cover 16 into large-diameter through hole 19c of terminal side portion 19 and by inserting it in small-diameter through hole 20c in output shaft side portion 20.

Terminal side portion 19 is equipped with three power terminals 21a, 21b, and 21c that are electrically connected to three brush terminal pieces 15a, 15b, and 15c of brush holder 14. Power terminals 21a, 21b, and 21c and have a fitting groove 21d that slidably fits to brush terminal pieces 15a, 15b, and 15c in the axial direction of output shaft 13. Width X of brush terminal pieces 15a, 15b, and 15c and width Y of fitting groove 21d of power terminals 21a, 21b, and 21c are set to establish a relationship of X<Y. Brush terminal pieces 15a, 15b, and 15c and power terminals 21a, 21b, and 21c are configured so that brush terminal pieces 15a, 15b, and 15c fit in fitting groove 21d of power terminals 21a, 21b, and 21c. An electrical connection is made by installing case cover 16, to which support plate 18 has been attached in advance, from the axial direction of output shaft 13 in relation to case frame 9 to which brush holder 14 has been fixed.

At this time, one side of fitting groove 21d engages with an engaging groove 15d formed in brush terminal pieces 15a, 15b, and 15c. Since there is the relationship expressed by X<Y, as mentioned above, brush terminal pieces 15a, 15b, and 15c are allowed to slide within the range of the width of fitting groove 21d, thus making it possible to absorb the dimensional tolerance in the axial direction of motor shaft 3 when brush terminal pieces 15a, 15b, and 15c fit with power terminals 21a, 21b, and 21c. Furthermore, brush terminal pieces 15a, 15b and 15care installed at brush holder 14 and power terminal pieces 21a, 21band 21c are installed at power terminal side portion 19 respectively so that they allow for a predetermined amount of movement. Therefore, the dimensional tolerance between adjoining terminals can be absorbed when connecting a plurality of terminals, as in the case of this embodiment. In other words, the brush terminal pieces and the power terminal pieces can be moved so that they can be easily connected even with small differences in the dimensions of the terminal pieces.

Further, terminal side portion 19 is equipped with a through hole 19d, in which the journal of first gear 11 is inserted, and a coil enclosure 19e for housing a noise suppressor coil 22. Terminal side portion 19 includes a partition wall 19f for partitioning the terminal connection between power terminals 21a, 21b, and 21c and brush terminal pieces 15a, 15b, and 15c from the gear meshing section of worms 3a, 3b, worm gears 10, 10, first gears 11, 11, and second gear 12. Thus, partition wall 19f prevents the lubricant such as grease, which is applied to the gear meshing section, from leaking into the terminal connection.

Figure 1:
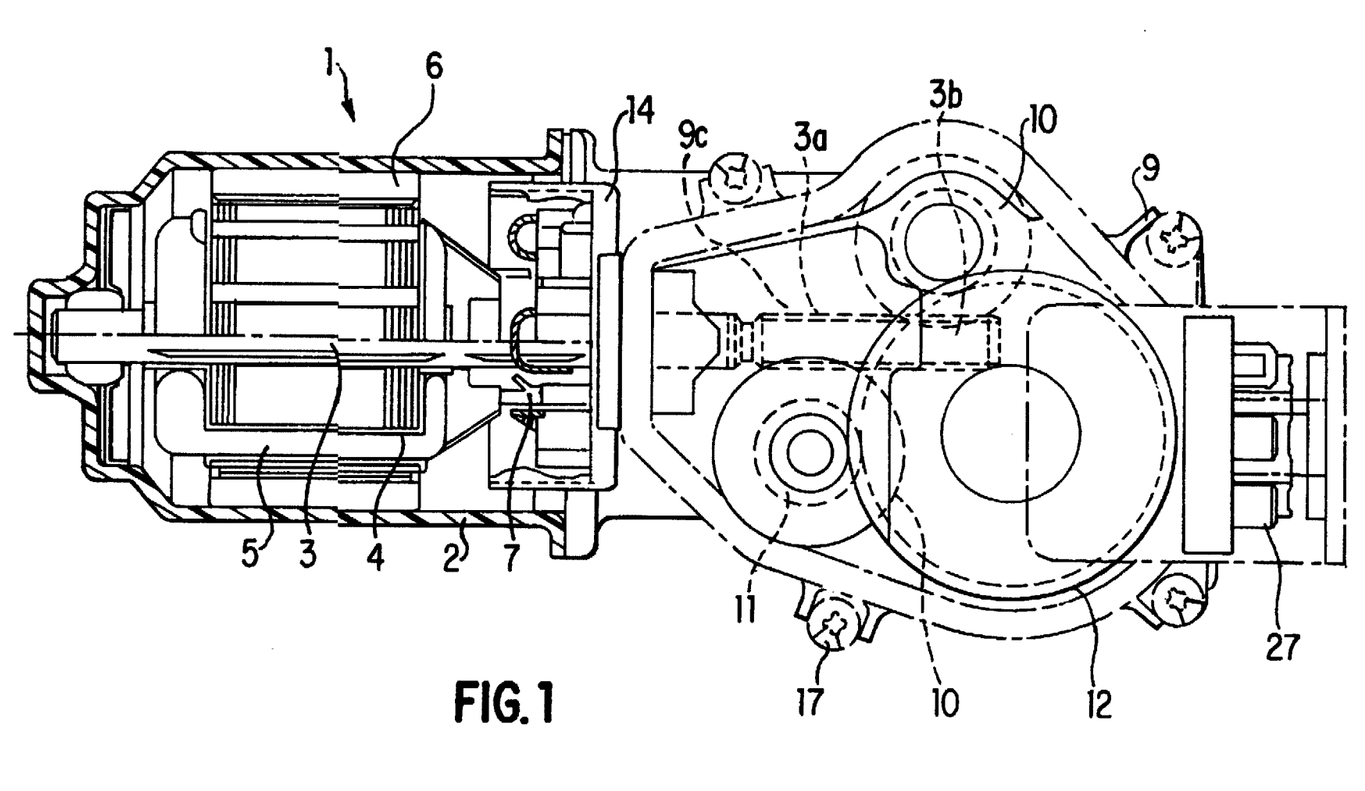
FIG. 1 is a top plan view of a wiper motor with a partial cross-sectional view thereof.
Figure 2:
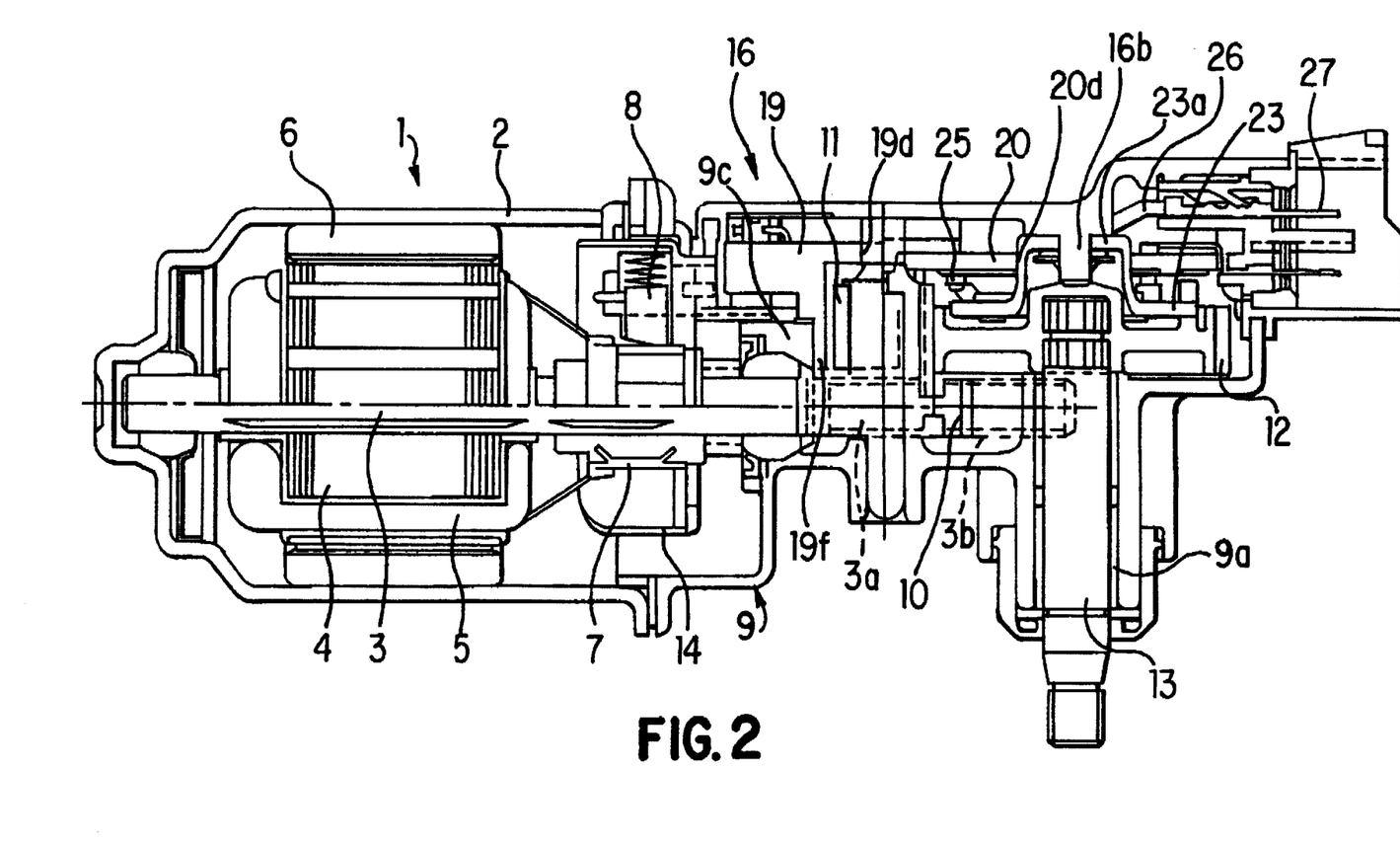
FIG. 2 is a longitudinal cross-sectional view of the wiper motor.
Figure 3:
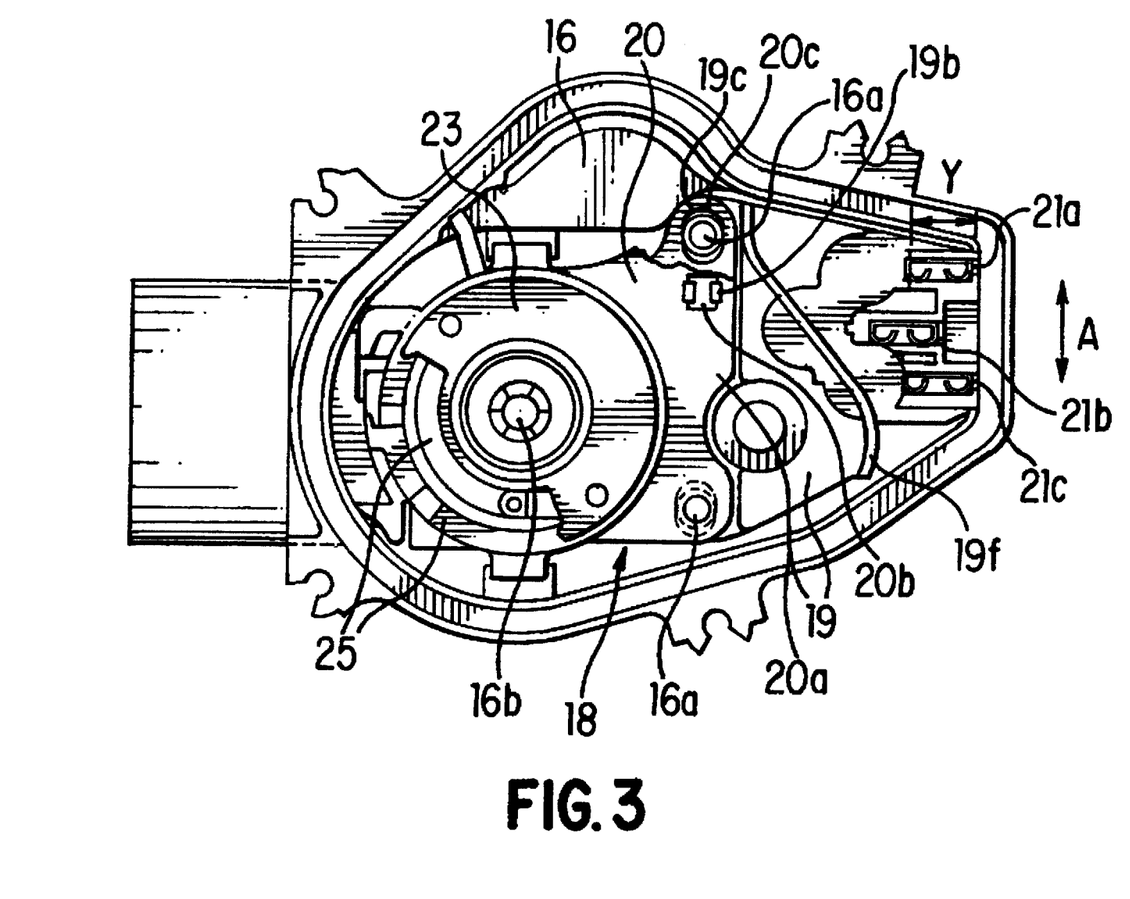
FIG. 3 is a bottom view showing a case cover with a support plate mounted thereon.
Figure 4:
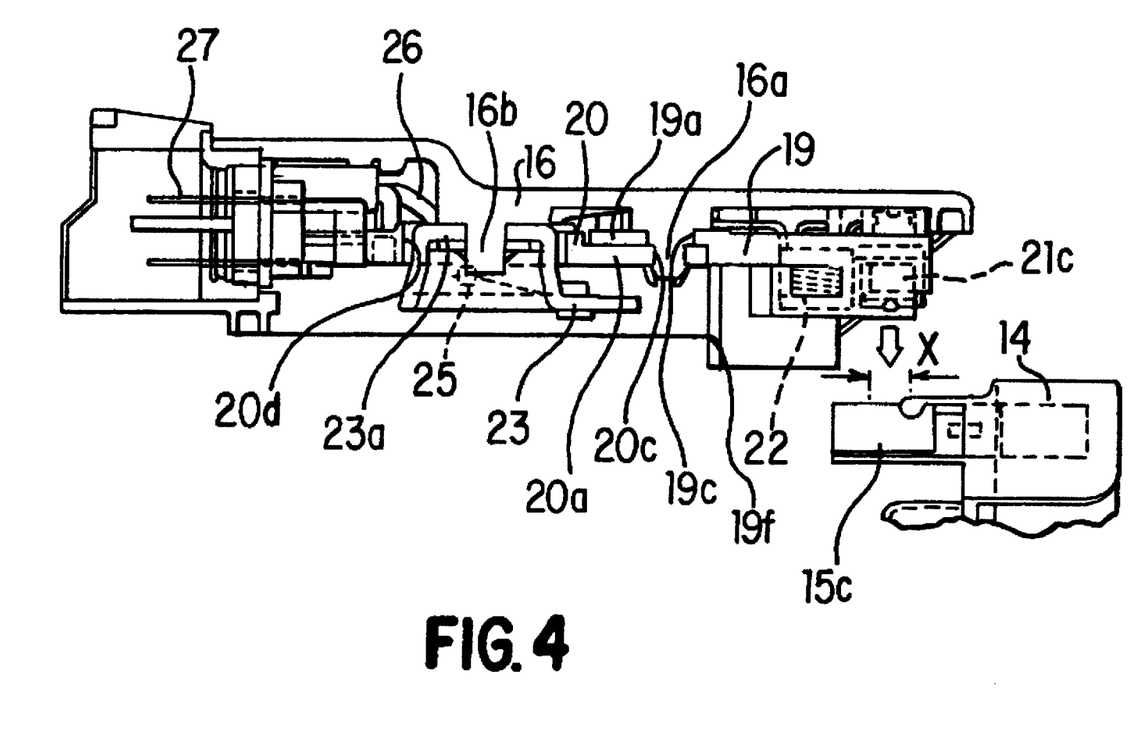
FIG. 4 is a cross-sectional view showing the case cover with the support plate mounted thereon.
Figure 5:
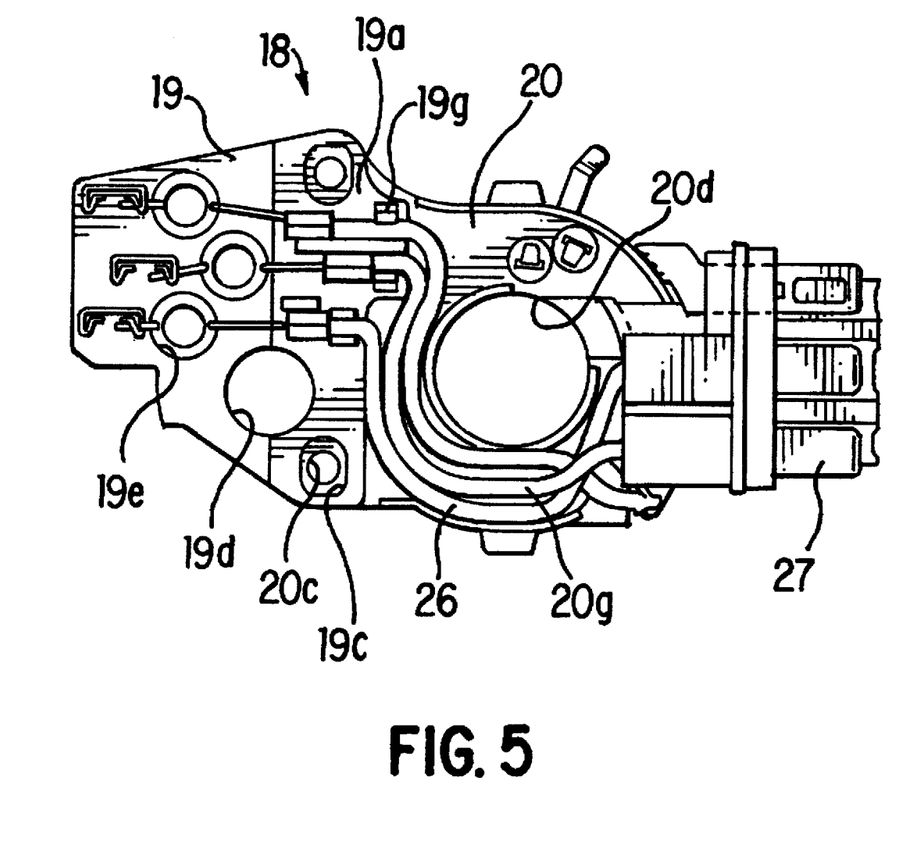
FIG. 5 is a top plan view of the support plate provided with a power supply lead wire.
Figure 6:
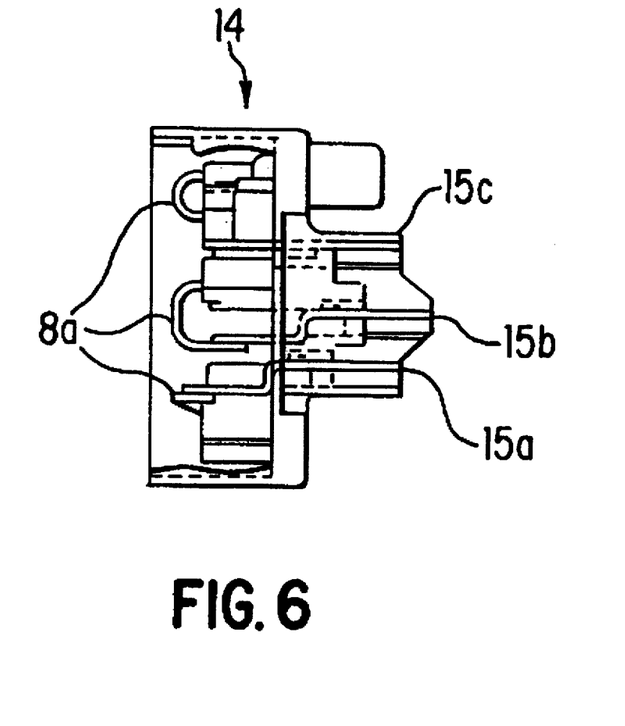
FIG. 6 is a front view of a brush holder with a partial cross-sectional view thereof.
Figure 7:
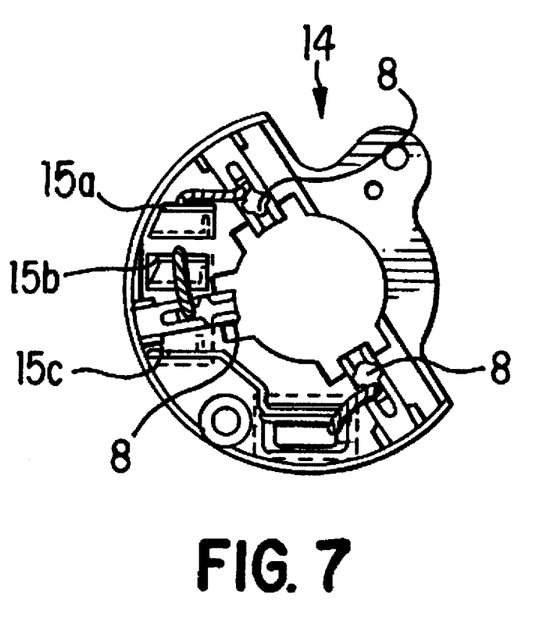
FIG. 7 is a side view of the brush holder.
Figure 8:
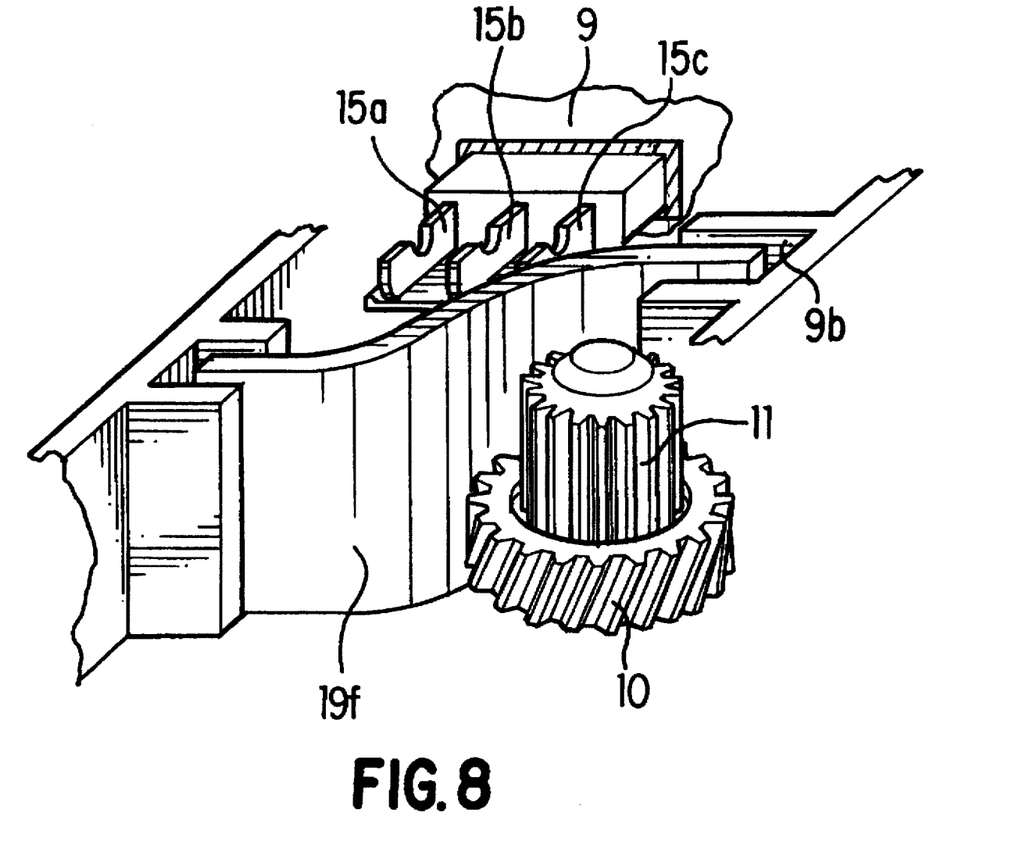
FIG. 8 is a perspective view of a partition wall.
Figure 9:
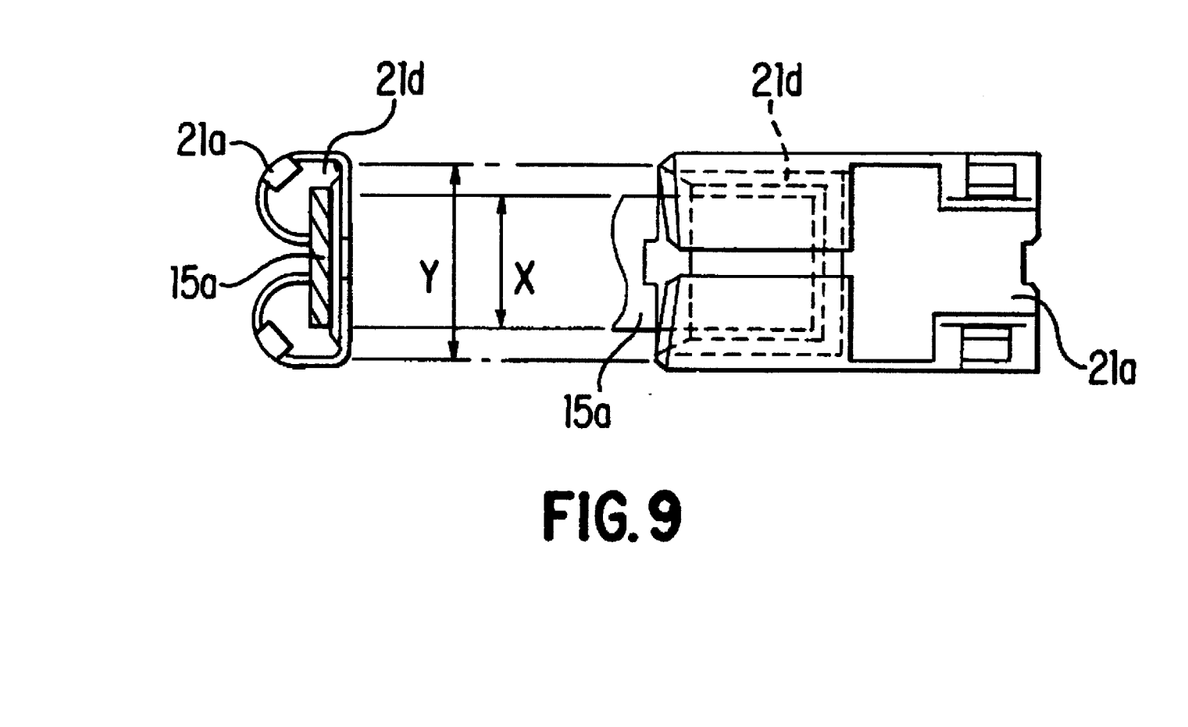
FIG. 9 is a diagram illustrating a brush terminal and a power terminal in a fitted state.

Both edges of partition wall 19f are formed in accordance with the direction, i.e. direction A in FIG. 3, in which terminal side portion 19 slides and engages loosely in a labyrinth mode with an engaging groove 9b formed in the side surface of the case frame 9. Both edges are located close to a stepped section 9c formed to approximately follow the contour of partition wall 19f. This allows terminal side portion 19 to move with respect to case frame 9. In addition, as shown in FIG. 8, partition wall 19f engages engaging groove 9b to form a labyrinth that effectively prevents leakage of lubricant from the gears to the terminal connection.

A relay insulator 23b, fixing contact plate 23, which rotates integrally with second gear 12, is retained to the case cover of second gear 12. A central part 23a of relay insulator 23b is inserted in a through hole 20b formed in output shaft side portion 20 and is rotatably journaled by a shaft supporting section 16b provided on case cover 16. A relay plate 25, which slides and contacts contact plate 23, is mounted on the outer circumferential section of through hole 20d of output shaft side portion 20. As the electric motor 1 drives second gear 12 forward or in reverse, relay plate 25 touches or leaves the current-carrying section of contact plate 23, thereby controlling the supply of power to power supply lead wire 26, which will be discussed in detail later.

A power connecting terminal 27 is on a portion of support plate 18 on the opposite side from that where electric motor 1 is disposed. The power connecting terminal 27 comprises one end of power supply lead wire 26 (this one end is electrically connected to a power supply) and a part of relay plate 25, which is bent. Retaining sections 19g and 20g are formed on the side surface of case cover 16 of terminal side portion 19. Retaining sections 19g and 20g retain power supply wire 26. Power supply lead wire 26 extends from power connecting terminal 27 and is retained by retaining sections 19g and 20g of the two halves 19 and 20. The power supply lead wire 26 reaches the noise suppressor coil 22 and is electrically connected from noise suppressor coil 22 to power terminals 21a, 21b, and 21c. Thus, currents are supplied to brush 8 via power connecting terminal 27, power supply lead wire 26, power terminals 21a, 21b, 21c and brush terminal pieces 15a, 15b, 15c.

In the embodiment of the present invention described above, in order to install case cover 16 onto case frame 9, brush holder 14 is attached to case frame 9 and the necessary components, such as worm gears 10, 10, first gears 11, 11, second gear 12, and output shaft 13 are installed beforehand. Support plate 18, to which power supply lead wire 26 has been attached, contact plate 23 and relay plate 25 are installed to case cover 16 in advance. Then, case cover 16 is installed from the axial direction of output shaft 13 with respect to case frame 9. This fits power terminals 21a, 21b, and 21c provided on terminal side portion 19 of support plate 18 to brush terminal pieces 15a, 15b, and 15c provided on the brush holder 14. Thus, an electrical connection is made between terminals 15a, 15b, 15c and terminals 21a, 21b, 21c. Since terminal side portion 19 is supported slidably with respect to output shaft side portion 20, as previously described, terminal side portion 19 can be installed while moving it to accomplish proper positioning of power terminals 21a, 21b, and 21c in relation to brush terminal pieces 15a, 15b, and 15c.

Thus, in an embodiment of the present invention, installing case cover 16 onto case frame 9 permits the connection of brush terminal pieces 15a, 15b, and 15c to the power terminals 21a, 21b, and 21c. The support plate 18, on which power terminals 21a, 21b, and 21c are mounted, is divided into two sections. Namely, output shaft side portion 20, which is integrally supported by case cover 9, and terminal side portion 19, which is movably supported by output shaft side portion 20. Power terminals 21a, 21b, and 21c are included on the terminal side portion 19. As a result, when installing case cover 16 onto case frame 9, terminal side portion 19 can be moved for accurate positioning of power terminals 21a, 21b, 21c and brush terminals 15a, 15b, 15c. This makes it possible to absorb dimensional tolerances, machining errors, or assembly errors of the components such as case frame 9, brush holder 14, case cover 16 and support plate 18. This permits easier installation and also makes it possible to prevent brush terminal pieces 15a, 15b, 15c and power terminals 21a, 21b, 21c from deforming due to assembly accompanied by undue stress. Namely, each terminal piece allows for a predetermined amount of movement, thereby absorbing dimensional tolerance between adjoining terminals. Setting the width X of the brush terminal pieces less than the width Y of fitting groove 21d of power terminals makes movement of the brush terminal pieces in the axial direction of the motor possible. Dividing the support plate into two sections absorbs dimensional tolerances of the whole body.

Although terminal side portion 19 is supported so that it may be moved with respect to output shaft side portion 20, power supply lead wire 26 is retained on retaining sections 19g, 20g for holding the lead wire that is formed on the side surface of case cover 16 of the two halves 19 and 20. Therefore, the two halves 19 and 20 are integrally combined in an elastic manner by power supply lead wire 26, preventing terminal side portion 19 from rattling.

Thus, since the present invention is configured as stated above, installing the case cover onto the case frame enables the connection between the brush terminals provided on the brush holder fixed to the case frame and the power terminals provided on the support plate fixed to the case cover. The support plate is divided into the terminal side portion where the power terminals are provided and the output shaft side portion, which is disposed on the output shaft side. The terminal side portion is movably supported by the output side portion. As a result, when installing the case cover onto the case frame, the terminal side portion can be moved for accurate positioning of the power terminals and the brush terminals. This makes it possible to absorb the dimensional tolerances, machining errors, or assembly errors of the components such as the case frame, the brush holder, the case cover, and the support plate, thus permitting easier installation. It also makes it possible to prevent the terminals from deforming due to assembly accompanied by undue stress.

What is claimed is:

1. A terminal connector for an electric motor with a speed reducer having an output shaft, the terminal connector comprising a support plate having at least one power terminal for electrical connection with at least one brush terminal of said motor, said support plate including a first portion and a second portion, said first portion being provided with said at least one power terminal and said second portion being located adjacent said output shaft, said first portion being movable with respect to said second portion to facilitate alignment and connection of said at least one power terminal with said at least one brush terminal.

2. The terminal connector according to claim 1 wherein said first portion further comprises a lap and a retaining hook formed on said first portion lap, and said second portion further comprises a lap and an engaging hole formed on said second portion lap wherein said first portion lap and said second portion lap overlap and said retaining hook is loosely inserted in said engaging hole and supports said first portion so that it freely slides with respect to said second portion.

3. The terminal connector according to claim 2 wherein said first portion lap includes a first through hole having a first diameter and said second portion lap includes a second through hole having a diameter smaller than said first diameter wherein said through hole in said first portion lap and said through hole in said second portion lap are positioned to have a projection inserted therein so that said first portion is movable with respect to said second portion.

4. The terminal connector according to claim 1 wherein said first portion further comprises a partition wall for partitioning the at least one power terminal from the speed reducer of the motor.

5. The terminal connector according to claim 1 wherein said at least one power terminal comprises a plurality of power terminals.

6. The terminal connector according to claim 1 wherein said at least one power terminal includes a fitting groove for slidably fitting said at least one power terminal with said at least one brush terminal.

7. A terminal connection for an electric motor with a speed reducer and an output shaft, comprising:

a case frame;

a case cover for attachment to the case frame;

a brush holder fixed to said case frame and including a brush terminal; and a support plate fixed to said case cover wherein said support plate comprises a terminal portion provided with a power terminal and an output shaft portion; and said terminal portion being movable with respect to said output shaft portion so that, when said case cover is installed from an axial direction of the output shaft with respect to said case frame, said power terminal and said brush terminal are aligned for electrical connection to each other.

8. The terminal connection according to claim 7, wherein said case cover includes an inner surface, said terminal portion includes a lap and a retaining hook formed on said terminal portion lap, and said output shaft portion includes a lap and an engaging hole formed on said output portion lap, and said terminal portion lap and said output shaft portion lap overlap when said retaining hook of said terminal portion is loosely inserted in said engaging hole of said output shaft portion positioned on said inner surface of said case cover to support said terminal portion so that it is movable.

9. The terminal connection according claim 8, wherein said terminal portion includes a through hole with a first diameter and said output shaft portion includes a second through hole with a second diameter smaller than said first diameter and said inner surface of said case cover includes a fixing projection which projects from said inner surface of said case cover toward said case frame and is inserted and retained in said second through hole and loosely inserted in said first through hole thereby fixing said output shaft portion to said case cover and so that said terminal portion is movable.

10. The terminal connection according to claim 8, wherein said power terminal is electrically connected to a power supply lead wire and at least one lead wire retaining section to retain the power supply lead wire is provided on both said terminal portion and said output shaft portion, which are opposite and face the inner surface of said case cover.

11. The terminal connection according to claim 7, wherein said terminal portion includes a partition wall for partitioning the power terminal from the speed reducer of the motor.

12. The terminal connection according to claim 7, wherein said brush terminal is electrically connected to a brush that is slidable to contact a commutator.

13. A method of electrically connecting a power terminal mounted on a support plate with a brush terminal of an electric motor having a speed reducer and an output shaft, the method comprising:

supporting the output shaft and a brush holder of the motor on a case frame, the brush holder including the brush terminal, dividing the support plate into two sections, a terminal section having the power terminal mounted thereon and an output shaft section, attaching the support plate to a case cover such that the terminal section of the support plate is movable in relation to the output shaft section, installing the case cover over the case frame in an axial direction of the output shaft; and moving the terminal section relative to the output shaft section to electrically connect the power terminal with the brush terminal while accommodating any dimensional misalignments between the case cover and case frame.

14. The method according to claim 13, further comprising attaching a contact plate with a relay insulator to the case cover and a relay plate to said support plate.

15. The method according to claim 13, wherein said case cover includes an inner surface, said terminal section includes a lap and a retaining hook formed on said lap, and said output shaft section includes a lap and an engaging hole formed on said lap, and whereby said terminal section lap and said output shaft section lap overlap when said retaining hook of said terminal portion is loosely inserted in said engaging hole of said output shaft portion positioned on said inner surface of said case cover to support said terminal portion so that it is movable.

16. The method according to claim 13, wherein the terminal section includes a through hole with a first diameter and the output shaft section includes a second through hole with a second diameter smaller than the first diameter and the inner surface of the case cover includes a fixing projection projecting from the inner surface of the case cover toward the case frame and is inserted and retained in the second through hole and loosely inserted in the first through hole thereby fixing the output shaft section to the case cover and so that the terminal section is movable.

17. The method according to claim 13, wherein said power terminal is electrically connected to a power supply lead wire and at least one lead wire retaining section to retain the power supply lead wire is provided on both said terminal portion and said output shaft portion, which are opposite and face the inner surface of said case cover.

18. The method according to claim 13, wherein the terminal section includes a partition wall for partitioning the power terminal from the speed reducer of the motor.

19. A method of electrically connecting a power terminal mounted on a support plate with a brush terminal of an electric motor having a a case cover, the method comprising:

dividing the support plate into two sections, a terminal section having the power terminal mounted thereon and an output shaft section, attaching the support plate to the case cover, and moving the terminal section relative to the output shaft section to electrically connect the power terminal to the brush terminal.

* * * * *

UNITED STATES PATENT AND TRADEMARK OFFICE
CERTIFICATE OF CORRECTION

PATENT NO. : 5,691,585
DATED : November 25, 1997
INVENTOR(S) : Hirokazu SHODA

It is certified that error appears in the above-indentified patent and that said Letters Patent is hereby corrected as shown below:

On the front cover, in item [73], change "Mitsuba Electric Manufacturing Co., Ltd." to --Mitsuba Corporation--.

Signed and Sealed this

Seventh Day of July, 1998

*Attest:*

BRUCE LEHMAN

*Attesting Officer*     *Commissioner of Patents and Trademarks*